(12) United States Patent
Warren

(10) Patent No.: US 11,033,107 B2
(45) Date of Patent: Jun. 15, 2021

(54) TILTING MOUNTING APPARATUS

(71) Applicant: Francis Douglas Warren, Bradley Beach, NJ (US)

(72) Inventor: Francis Douglas Warren, Bradley Beach, NJ (US)

(*) Notice: Subject to any disclaimer, the term of this patent is extended or adjusted under 35 U.S.C. 154(b) by 0 days.

(21) Appl. No.: 16/934,118

(22) Filed: Jul. 21, 2020

(65) Prior Publication Data

US 2021/0022504 A1 Jan. 28, 2021

Related U.S. Application Data

(60) Provisional application No. 62/874,552, filed on Jul. 16, 2019.

(51) Int. Cl.
*E04G 3/00* (2006.01)
*A47B 97/00* (2006.01)
*F16M 13/02* (2006.01)

(52) U.S. Cl.
CPC ......... *A47B 97/001* (2013.01); *F16M 13/022* (2013.01); *F16M 2200/063* (2013.01)

(58) Field of Classification Search
CPC .. F16M 13/022; F16M 11/048; F16M 11/046; F16M 2200/041; F16M 2200/063; A47B 97/001; H04N 5/64
USPC ............. 248/277.1, 682, 121, 123.11, 205.1, 248/220.21, 220.22, 274.1, 276.1, 278.1, 248/284.1, 280.11, 309.1, 917, 919, 923; 312/7.2; 348/836, 794, 825
See application file for complete search history.

(56) References Cited

U.S. PATENT DOCUMENTS

| | | | |
|---|---|---|---|
| 2,090,439 A | 8/1937 | George |
| 2,630,854 A | 3/1953 | Paul |
| 4,076,351 A | 2/1978 | Wyant |
| 4,082,244 A | 4/1978 | Groff |
| 4,561,674 A | 12/1985 | Alessio |

(Continued)

FOREIGN PATENT DOCUMENTS

GB 2222939 A 3/1990

OTHER PUBLICATIONS

MantelMount RB100 Recess Box—MantelMount Pull Down TV Mount Accessory, accessed Dec. 3, 2020 from https://www.mantelmount.com/products/mantelmount-rb100-recess-box, 6 pages.

(Continued)

*Primary Examiner* — Todd M Epps
(74) *Attorney, Agent, or Firm* — Dale J. Ream

(57) ABSTRACT

A mounting apparatus for positioning a television relative to a wall and a fireplace mantle includes a mounting plate coupled to a distal end of a positioning arm and is moved and positioned according to movement of the positioning arm. The positioning arm has a linear configuration with a proximal end mounted inside a wall housing which is itself mounted into a wall above the mantle of a fireplace. The positioning arm is pivotally movable between a retracted configuration completely inside the wall housing and a deployed configuration outside and extending away from the wall housing sufficiently that the plate (and television attached to the plate) is forward of and then below the outwardly extending mantle. The mounting plate is operable to tilt outwardly so as to clear the mantle and to swivel side to side at the viewing discretion of a user.

18 Claims, 6 Drawing Sheets

(56) References Cited

U.S. PATENT DOCUMENTS

| | | | |
|---|---|---|---|
| 4,691,886 A | 9/1987 | Wendling et al. | |
| 5,037,054 A | 8/1991 | McConnell | |
| 5,108,063 A | 4/1992 | Koerber et al. | |
| 5,224,677 A | 7/1993 | Close | |
| 5,299,993 A | 4/1994 | Habing | |
| 5,499,956 A | 3/1996 | Habing et al. | |
| 5,560,501 A | 10/1996 | Rupert | |
| 5,738,316 A | 4/1998 | Sweere et al. | |
| 5,743,503 A | 4/1998 | Voeller et al. | |
| 5,826,357 A * | 10/1998 | Hechler | A47B 81/06 40/428 |
| 5,826,846 A | 10/1998 | Buccieri et al. | |
| 5,857,756 A | 1/1999 | Fehre | |
| 5,876,008 A | 3/1999 | Sweere et al. | |
| 6,065,725 A | 5/2000 | Mason | |
| 6,065,909 A | 5/2000 | Cook | |
| 6,105,909 A | 8/2000 | Wirth et al. | |
| 6,419,196 B1 | 7/2002 | Sweere et al. | |
| 6,523,796 B2 | 2/2003 | Abramowsky et al. | |
| 6,592,090 B1 | 7/2003 | Li | |
| 6,695,274 B1 | 2/2004 | Chiu | |
| 6,889,404 B2 | 5/2005 | Lu et al. | |
| 6,901,987 B1 * | 6/2005 | Graham | G09F 11/29 160/121.1 |
| 6,905,101 B1 | 6/2005 | Dittmer | |
| 6,983,917 B2 | 1/2006 | Oddsen | |
| 7,014,157 B2 | 3/2006 | Oddsen | |
| 7,061,753 B2 | 6/2006 | Michoux et al. | |
| 7,252,277 B2 | 8/2007 | Sweere et al. | |
| 7,290,744 B2 | 11/2007 | Baldasari | |
| 7,300,029 B2 | 11/2007 | Petrick et al. | |
| 7,316,379 B1 * | 1/2008 | Graham | F16M 13/02 248/298.1 |
| 7,395,996 B2 | 7/2008 | Dittmer | |
| 7,398,950 B2 | 7/2008 | Hung | |
| 7,448,584 B2 | 11/2008 | Chen et al. | |
| 7,546,745 B2 | 6/2009 | Lee et al. | |
| 7,546,994 B2 | 6/2009 | Altonji et al. | |
| 7,663,868 B1 | 2/2010 | Lam | |
| 7,854,415 B2 | 12/2010 | Holbrook et al. | |
| 7,866,622 B2 | 1/2011 | Dittmer | |
| 7,950,613 B2 | 5/2011 | Anderson et al. | |
| 8,006,440 B2 | 8/2011 | Thomas et al. | |
| 8,074,950 B2 | 12/2011 | Clary | |
| 8,094,438 B2 | 1/2012 | Dittmer et al. | |
| 8,382,052 B1 * | 2/2013 | Mathieson | F16M 11/048 248/240 |
| 8,724,037 B1 | 5/2014 | Massey | |
| 8,740,164 B2 | 6/2014 | Tachibana | |
| 8,746,635 B2 | 6/2014 | Kim et al. | |
| 8,864,092 B2 | 10/2014 | Newville | |
| 8,970,795 B2 * | 3/2015 | Lemieux | F16M 13/02 348/836 |
| 9,004,430 B2 | 4/2015 | Conner | |
| 9,121,543 B2 | 9/2015 | Dittmer et al. | |
| 9,265,346 B1 | 2/2016 | Forney | |
| 9,625,091 B1 | 4/2017 | Massey | |
| 9,876,984 B2 | 1/2018 | Massey | |
| 10,139,045 B1 | 11/2018 | Keuter | |
| 10,257,460 B2 | 4/2019 | Massey | |
| 10,277,860 B2 | 4/2019 | Massey | |
| 10,281,050 B2 * | 5/2019 | Branyon | B32B 27/34 |
| 10,281,080 B1 | 5/2019 | Massey | |
| 10,738,941 B2 * | 8/2020 | Newville | F16M 11/2021 |
| 10,830,580 B2 | 11/2020 | Hodowany | |
| 2002/0043978 A1 | 4/2002 | McDonald | |
| 2002/0100851 A1 | 8/2002 | Abramowsky et al. | |
| 2002/0179791 A1 | 12/2002 | Kwon | |
| 2004/0084587 A1 | 5/2004 | Oddsen | |
| 2005/0010911 A1 | 1/2005 | Kim et al. | |
| 2005/0152102 A1 | 7/2005 | Shin | |
| 2005/0204645 A1 | 9/2005 | Bachinski et al. | |
| 2005/0236543 A1 | 10/2005 | Oneil | |
| 2006/0070210 A1 | 4/2006 | Amdahl et al. | |
| 2006/0077622 A1 | 4/2006 | Keely et al. | |
| 2006/0102819 A1 | 5/2006 | Li | |
| 2007/0023599 A1 | 2/2007 | Fedewa | |
| 2007/0030405 A1 | 2/2007 | Childrey et al. | |
| 2007/0040084 A1 | 2/2007 | Sturman et al. | |
| 2007/0058092 A1 * | 3/2007 | Ryu | F16M 13/02 348/836 |
| 2007/0221807 A1 | 9/2007 | Park | |
| 2007/0252056 A1 | 11/2007 | Novin | |
| 2008/0078906 A1 | 4/2008 | Hung | |
| 2008/0237424 A1 | 10/2008 | Clary | |
| 2009/0034178 A1 | 2/2009 | Le | |
| 2009/0050763 A1 | 2/2009 | Dittmer | |
| 2009/0108158 A1 | 4/2009 | Kim et al. | |
| 2009/0206221 A1 | 8/2009 | Timm et al. | |
| 2009/0212669 A1 | 8/2009 | Robert-Reitman et al. | |
| 2010/0006725 A1 | 1/2010 | Kim et al. | |
| 2010/0091438 A1 | 4/2010 | Dittmer | |
| 2010/0149736 A1 * | 6/2010 | Dittmer | F16M 13/022 361/679.01 |
| 2010/0155558 A1 | 6/2010 | Zhang et al. | |
| 2010/0171013 A1 | 7/2010 | Anderson et al. | |
| 2011/0043978 A1 | 2/2011 | Bremmon et al. | |
| 2011/0198972 A1 * | 8/2011 | Kirkeby | A47B 81/06 312/7.2 |
| 2011/0234926 A1 | 9/2011 | Smith | |
| 2012/0032062 A1 | 2/2012 | Newville | |
| 2012/0033371 A1 | 2/2012 | Pankros et al. | |
| 2012/0061543 A1 | 3/2012 | Juan | |
| 2012/0167486 A1 | 7/2012 | Lee | |
| 2013/0127306 A1 * | 5/2013 | Head | A47B 81/064 312/7.2 |
| 2013/0176667 A1 | 7/2013 | Kulkarni et al. | |
| 2013/0187019 A1 | 7/2013 | Dittmer et al. | |
| 2013/0257236 A1 * | 10/2013 | Head | A47B 81/06 312/7.2 |
| 2014/0211100 A1 | 7/2014 | Massey | |
| 2018/0131895 A1 | 5/2018 | Massey | |
| 2019/0072231 A1 | 3/2019 | Newville et al. | |
| 2019/0309895 A1 | 10/2019 | Newville | |
| 2019/0335135 A1 | 10/2019 | Massey | |
| 2020/0355319 A1 | 11/2020 | Newville et al. | |

OTHER PUBLICATIONS

MantelMount MM750 Pro Above Fireplace Pull Down TV Mount, accessed Dec. 3, 2020 from https://www.mantelmount.com/products/mm750-pro-pull-down-tv-mount, 6 pages.

* cited by examiner

TILTING MOUNTING APPARATUS

REFERENCE TO RELATED APPLICATIONS

This application claims the priority of provisional patent application U.S. Ser. No. 62/874,552 filed Jul. 16, 2019 titled Tilting Mounting Apparatus, and which is incorporated herein by reference in its entirety.

BACKGROUND OF THE INVENTION

This invention relates generally to television mounting devices and, more particularly, to a mounting apparatus having a mounting plate coupled to a distal end of a movable positioning arm and that includes a pivotal or tilting assembly so that the mounting plate and television coupled thereto avoids contact with a fireplace mantle when being deployed.

In new home construction, it is common to have a fireplace (whether an actual functioning fireplace or just a faux fireplace) having a mantle extending outwardly away from a wall and from the fireplace itself. Further, it has become common to mount a flat screen television to the wall above the fireplace and mantle. And, now, there are movable mounting arms which enable the television to be stowed near the wall above the fireplace when not in use and then rotated to position the television in front of the fireplace for viewing a television program or movie.

Unfortunately, the television or its mounting apparatus is displaced from the wall in a sloppy manner when stowed or is blocked by the mantle from being positioned correctly forward and downward of the mantle. In other words, the mounting arm, the television, and the television cables are exposed and aesthetically unattractive using currently available products and technology. In the end, a consumer may be disappointed in how his "high-end" or custom audio/visual setup appears and functions due to inadequate mounting devices. Further, current products and proposals do not provide an efficient solution to the problem of a television making contact with a fireplace mantle as it pivots or rotates from a stowed position above the mantle to a deployed position forward and downward of the mantle, e.g. into a comfortable viewing position.

Therefore, it would be desirable to have a mounting apparatus that is movable between a retracted or stowed configuration at which the flat-screen television is flush with a wall above a mantle and a deployed configuration that tilts in order to clear a profile of a mantle and so that the television may be positioned in front of the fireplace.

SUMMARY OF THE INVENTION

A mounting apparatus for positioning a television relative to a wall and a fireplace mantle according to the present invention includes a mounting plate operably coupled to a distal end of a positioning arm so as to be moved and positioned according to movement of the positioning arm. The positioning arm has a linear configuration with a proximal end mounted to a rear section of a wall housing which is itself mounted into a wall above the mantle of a fireplace within a home. The positioning arm is pivotally movable between a retracted configuration completely inside the wall housing and a deployed configuration outside and extending away from the wall housing sufficiently such that the mounting plate (and television attached to the plate) is forward of and then below the outwardly extending mantle. The mounting plate is operable to tilt outwardly so as to clear the mantle and to swivel side to side at the viewing discretion of a user.

Therefore, a general object of this invention is to provide a mounting apparatus that enables a television to at first be mounted neat and flush against a wall above a fireplace mantle and then to be moved outwardly and downwardly to a position in front of the mantle for viewing.

Another object of this invention is to provide a mounting apparatus, as aforesaid, having a mounting plate at an outer end of a movable positioning arm that may be tilted to avoid contact with the mantle as the arm is moved between retracted and deployed positions.

Still another object of this invention is to provide a mounting apparatus, as aforesaid, in which the mounting plate may be swiveled side to side at the viewing discretion of a person watching the television.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a sectional view taken along line 2b-2b of FIG. 2a;

FIG. 4a is a side view of the mounting apparatus as in FIG. 3a;

FIG. 6a is a top view of the mounting apparatus as in FIG. 5a;

FIG. 6b is an isolated view on an enlarged scale taken from FIG. 6a; and

FIG. 6c is a top view of the mounting apparatus as in FIG. 5b.

DESCRIPTION OF THE PREFERRED EMBODIMENT

Figure 1:
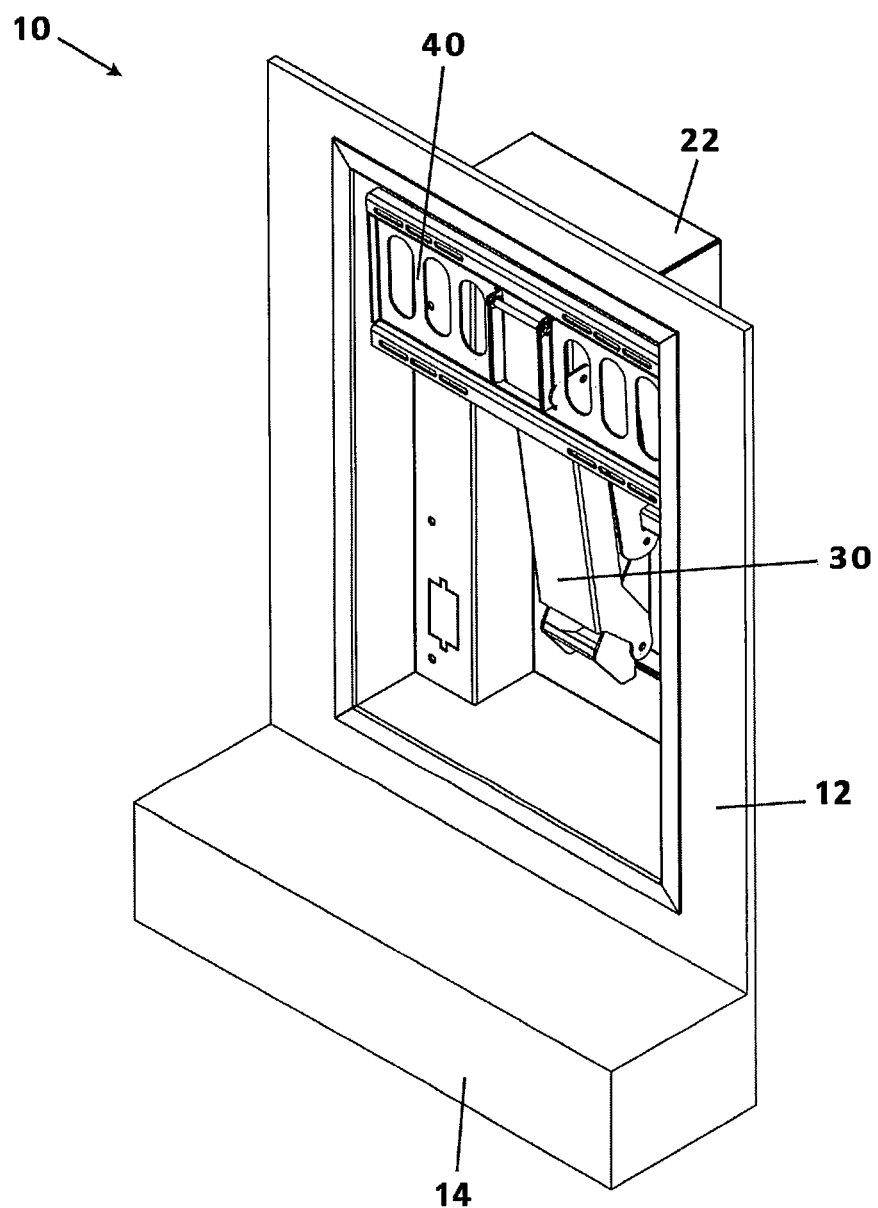
FIG. 1 is a perspective view of a mounting apparatus according to a preferred embodiment of the present invention and illustrated in a fully retracted configuration.

A mounting apparatus for positioning a television forward of a fireplace mantle according to a preferred embodiment of the present invention will be described with reference to FIGS. 1 to 6c of the accompanying drawings. The mounting apparatus 10 includes a wall housing 20, a positioning arm 30, and a mounting plate 40. Although the present invention is specifically relative to the mounting plate 40 coupled to the positioning arm 30, additional structures are introduced and described for the contextual clarification they provide.

The mounting apparatus 10 includes a wall housing 20 that must first be installed in a wall 12 above a fireplace mantle 14. The wall housing 20 includes a rear section 22 inset into the wall and a front section 24 forward of said rear section 22 defining an open front opposite said rear section 22 and an interior area, the open front being flush with a front surface of the wall 12. The front section 24 has a profile (dimensions) that is larger than the rear section 22 and the interior areas of the front section 24 and rear section 22 are in communication with one another, i.e. the wall housing 20 is hollow. It is critical to the function of the present invention that the wall housing 20 is inset into a wall of a residence so that a television can be mounted flat against the wall and that the mounting arm 30 may be stowed inside the inset wall housing 20 when retracted.

Figure 4A:
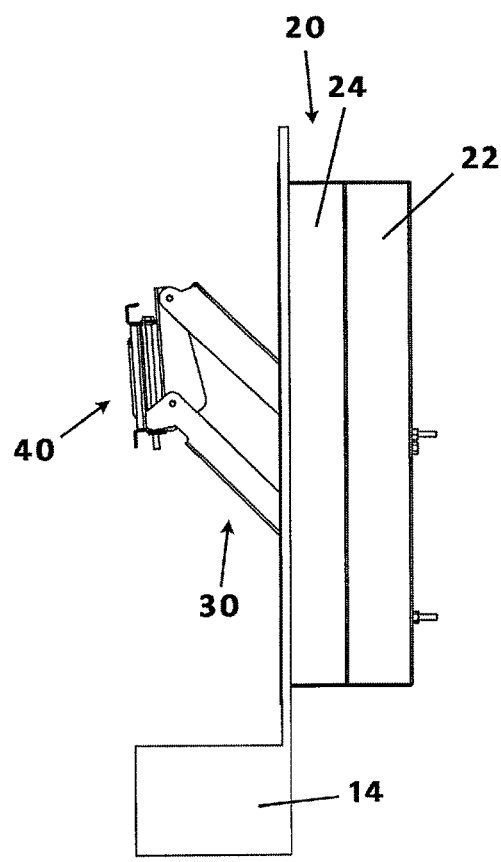
Figure 4B:
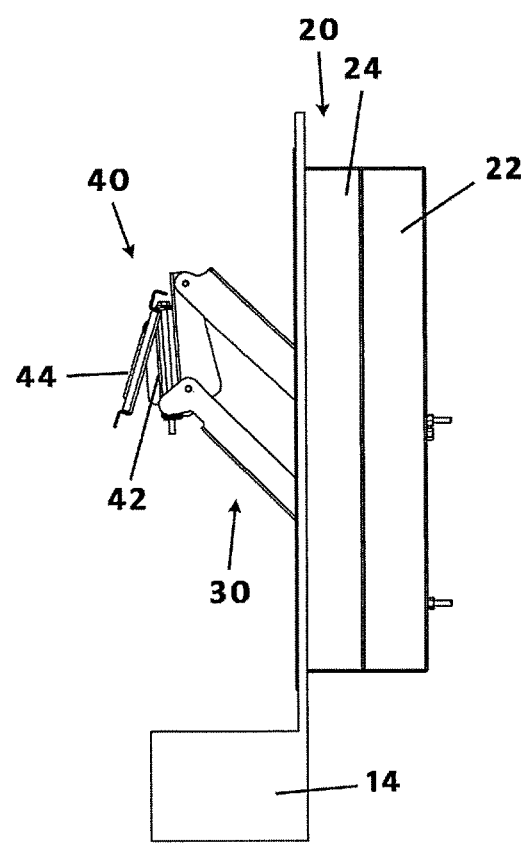
FIG. 4b is a side view of the mounting apparatus as in FIG. 3b.
Figure 5A:
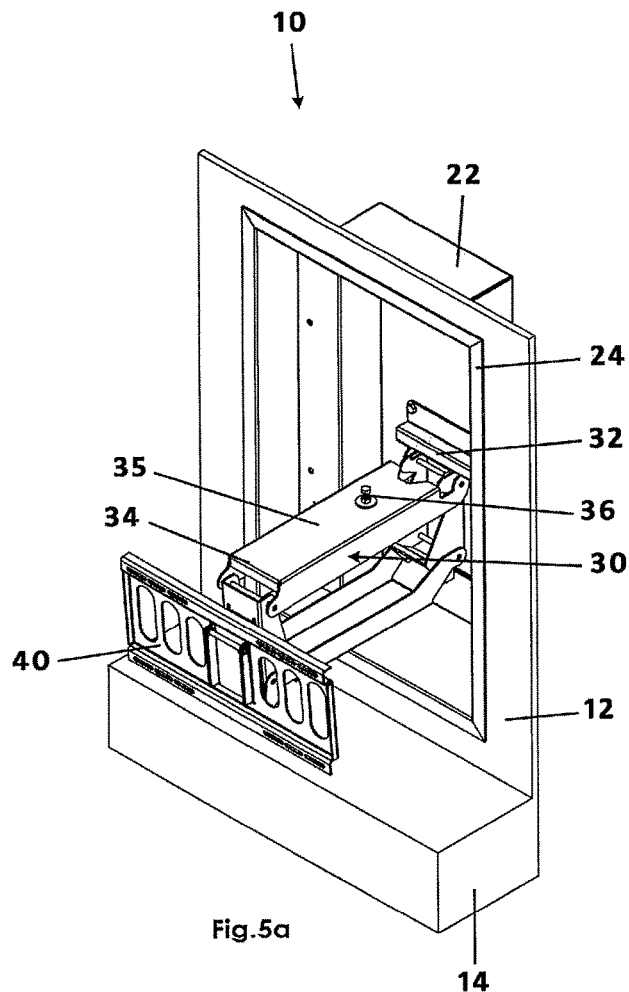
FIG. 5a is a perspective view of the mounting apparatus as in FIG. 3a, illustrated in a fully deployed configuration.
Figure 5B:
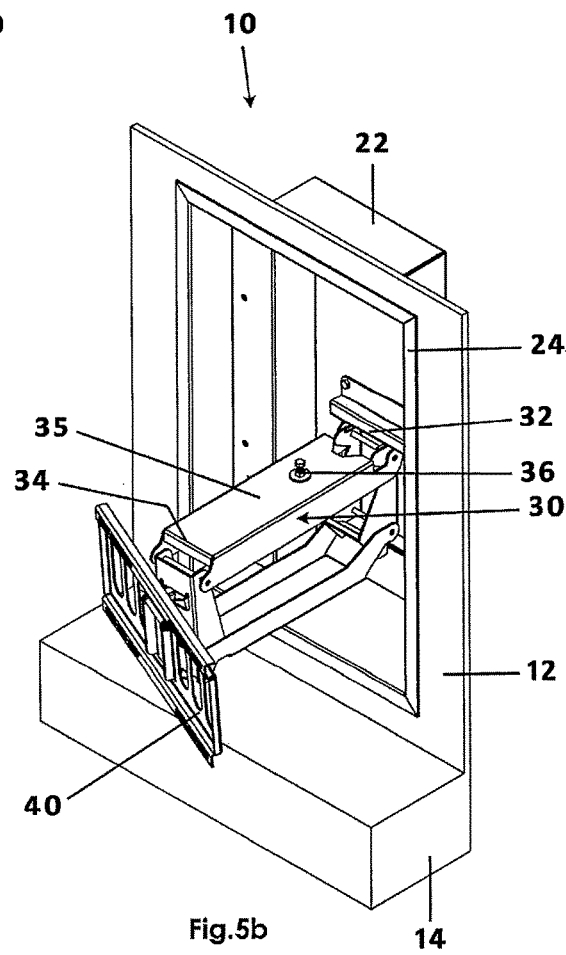
FIG. 5b is a perspective view of the mounting apparatus as in FIG. 3a, illustrated in a fully deployed configuration and with the mounting plate in a swiveled configuration.
Figures 6A, 6C:
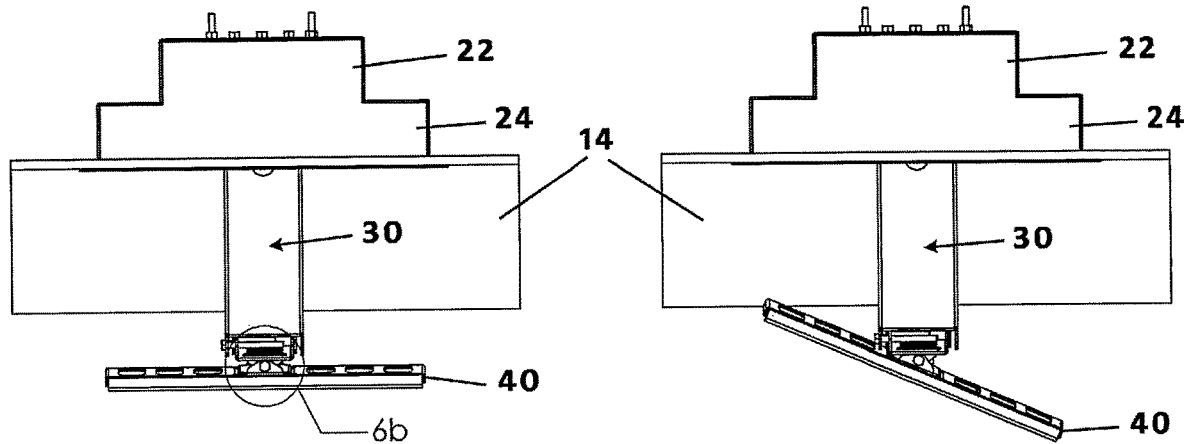
Figure 6B:
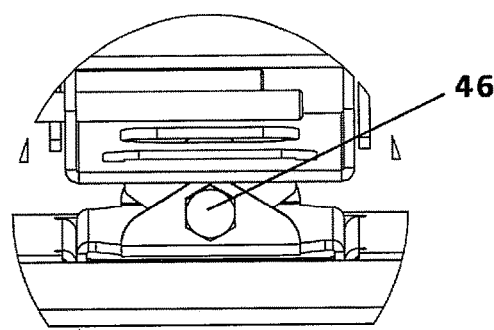

The positioning arm 30 includes a proximal end 32 pivotally coupled to an interior surface of the rear section 22 of the wall housing 20. The positioning arm 30 includes a distal end 34 opposite the proximal end 32 and a body portion 35 that extends between the two ends, the positioning arm 30 having a generally linear configuration (FIG. 5a). The proximal end 32 may include a fastening assembly pivotally coupled to the inner surface of the rear section 22 such that the positioning arm 30 is pivotally movable between a stowed configuration positioned completely inside the interior area (FIG. 2b) and a deployed configuration extending at least partially outside of and extending away from the interior area (FIGS. 4a to 5b).

Figure 3A:
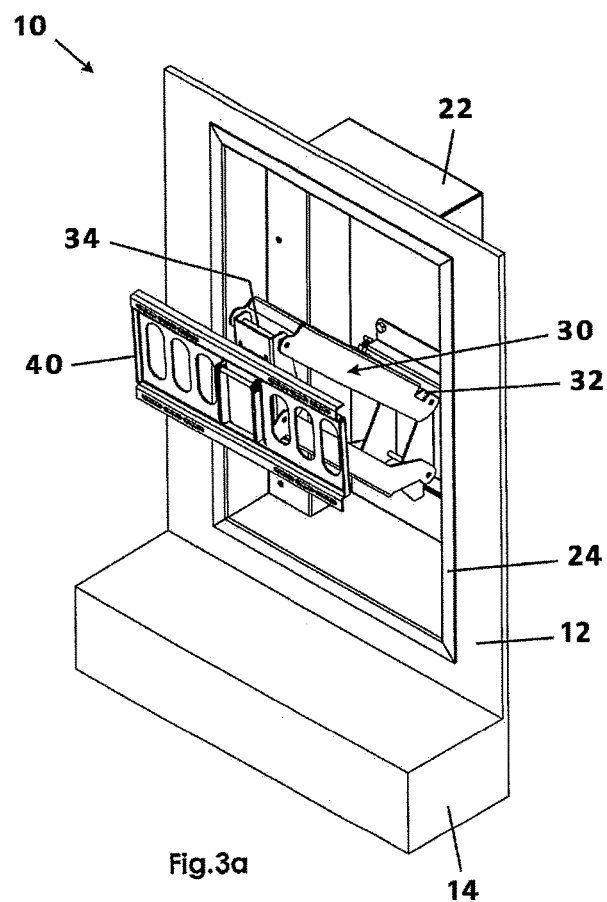
FIG. 3a is a perspective view of the mounting apparatus of FIG. 1 illustrated in a partially deployed configuration.

Further, the mounting plate 40 is configured to receive and hold a television (not shown). More particularly, the mounting plate 40 has a generally planar or flat configuration to which a flat screen television may be mounted. The mounting plate 40 is operably coupled to the distal end 34 of the positioning arm 30 and is, therefore, positioned inside the interior area at the retracted configuration (FIG. 1) and positioned outside the interior area at the deployed configuration (FIG. 3a). Normally, the mounting plate 40 has a back portion 42 that having a flat, vertical, and upstanding configuration parallel to the wall 12 and a front portion 44 pivotally coupled to the back portion 42, such as with a hinge. The front portion 44 is parallel to the back portion 42 in a retracted and normal configuration but may be tilted such that a lower edge tilts forward so as to avoid contact with the mantle 14. Therefore, a television coupled to the front portion 44 of the mounting plate 40 is also normally parallel to the wall 12 but may be tilted to clear the mantle 14 (FIG. 4b). However, the mounting plate 40 includes two unique mounting features that allow the mounting plate 40 to be extended from the wall 12 (i.e. the retracted configuration) and to clear the mantle 14 even if the mantle 14 extends into a room a distance that would normally be a barrier to the mounting plate 40.

Figure 3B:
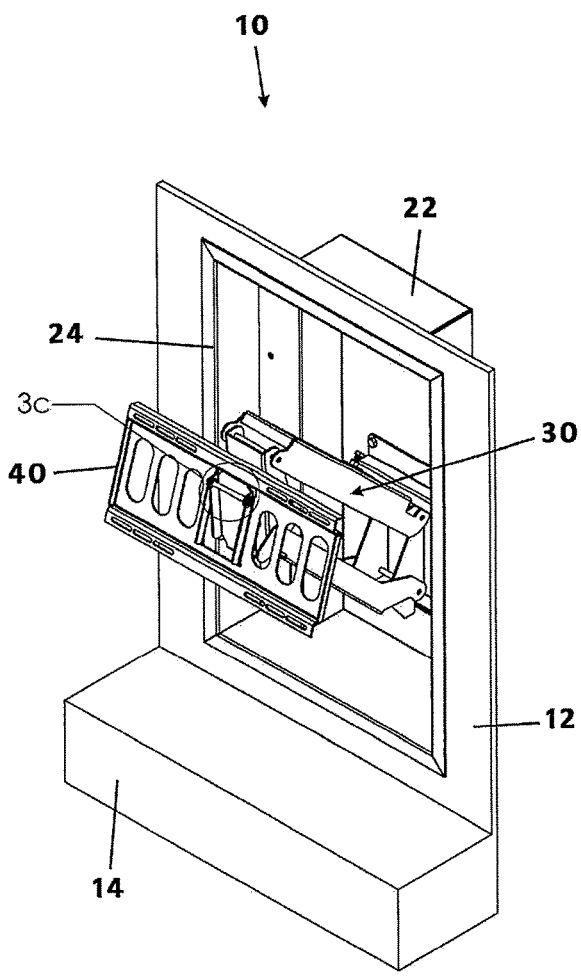
FIG. 3b is a perspective view of the mounting apparatus of FIG. 1 illustrated in a partially deployed configuration and with the mounting plate in a tilted configuration.
Figure 3C:
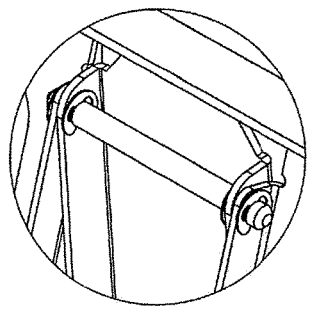
FIG. 3c is an isolated view on an enlarged scale taken from FIG. 3b.

More particularly, the mounting plate 40 includes the back portion 42 coupled to the distal end 34 of the positioning arm 30 with an upstanding fastener 46—such as a vertically mounted bolt or rod—defining a vertical axis about which the plate 40 may be selectively swiveled between a left viewing configuration and a right viewing configuration (FIGS. 5a to 6c). In use, a user may desire to swivel the television to the left or to the right to accommodate if persons are seated to the left or right of the television, respectively. With further description, the mounting plate 40 may include a front portion 44 coupled to the back portion 42 with a hinge 48 forming a horizontal axis about which the mounting plate 40 may be selectively pivoted between a normally upstanding configuration (FIGS. 3a and 4a) and a tilted configuration in which a bottom edge of the mounting plate 40 is extended forward of a top edge of the front portion of the mounting plate 40 (FIGS. 3b and 4b). Being able to tilt the mounting plate 40 enables a user to manipulate the mounting plate 40 (and attached television) to clear the mantle 14 as the positioning arm 30 is being extended. In other words, if the television appears it will impact the mantle 14, a user simply tilts the mounting plate 40 and impact is avoided as shown in FIGS. 3b and 4b.

Figure 2A:
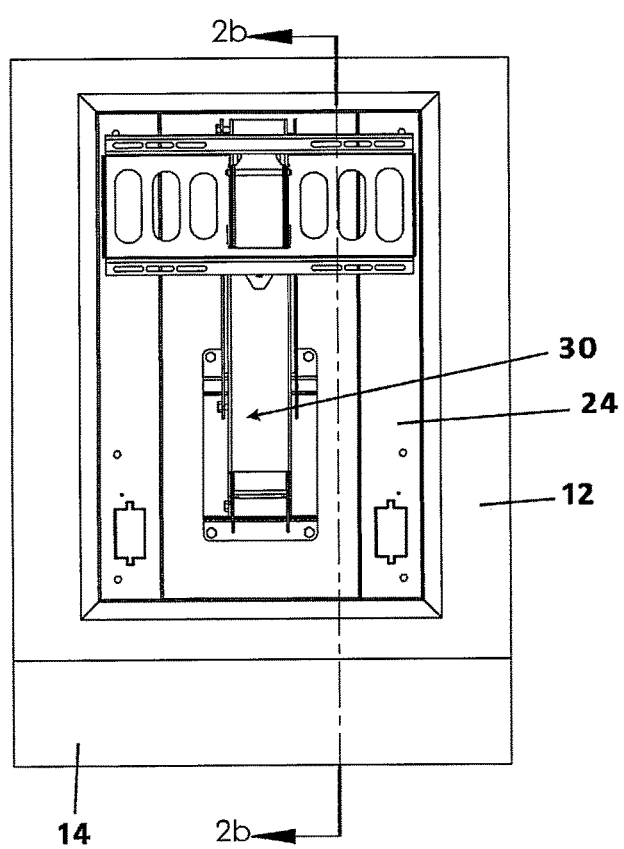
FIG. 2a is a front view of the mounting apparatus as in FIG. 1.
Figure 2B:
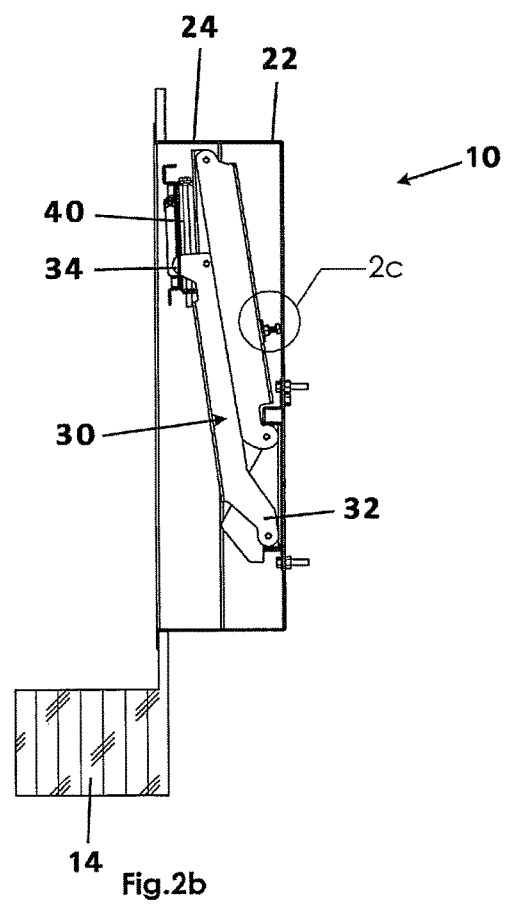
Figure 2C:
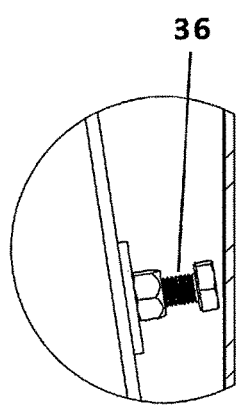
FIG. 2c is an isolated view on an enlarged scale taken from FIG. 2b.

In another aspect, the positioning arm 30 is prevented from over-retracting and causing damage to the inset rear section 22. More particularly, a travel stop 36 may be mounted to a top surface of the positioning arm 30 somewhere between the proximal and distal ends thereof, the travel stop 36 being operable to bear against a rear wall of the rear section 22 of the wall housing 20 (FIG. 2c).

In use, the mounting apparatus 10 enables a television to be neatly retracted nearly flush with a wall above fireplace mantle 14 or to be extended (i.e. lowered) away from the wall to a position in front of or below the mantle 14. In other words, the mounting apparatus 10 and television (not shown) may be retracted and stowed in a manner that hides the extension apparatus, cords, or any other hardware and then deployed away from the wall by a user desiring to watch television at a comfortable height and lateral position. The user may tilt the mounting plate 40 to avoid or clear the mantle 14 when being deployed and as described above.

It is understood that while certain forms of this invention have been illustrated and described, it is not limited thereto except insofar as such limitations are included in the following claims and allowable functional equivalents thereof.

The invention claimed is:

1. A mounting apparatus for positioning a television relative to a wall and a fireplace mantle, so that the television is positioned flush against an exterior surface of the wall, said mounting apparatus comprising:

a wall housing inset into the wall and defining an open front and an interior area, said open front being flush with a front surface of the wall;

a positioning arm having a proximal end pivotally coupled to said wall housing and a distal end opposite said proximal end and a body portion having a linear configuration extending between said proximal and distal ends, said positioning arm being pivotally movable between a retracted configuration positioned completely inside said interior area and a deployed configuration extending at least partially outside of and extending away from said interior area; and a mounting plate operably coupled to said distal end of said positioning arm and positioned inside said interior area at said retracted configuration and positioned outside said interior area at said deployed configuration, said mounting plate including a back portion coupled to said distal end of said positioning arm and that includes a front portion pivotally coupled to said back portion with a hinge defining a horizontal axis about which the mounting plate is selectively pivoted between a normally upstanding configuration and a tilted configuration in which a bottom edge of said mounting plate is extended outwardly and forwardly of said back portion said mounting plate.

2. The mounting apparatus as in claim 1, wherein said wall housing includes a rear section having a rear wall and a front section forward of said rear section, said front section defining said open front and said interior area.

3. The mounting apparatus as in claim 2, further comprising a travel stop mounted to a top surface of said positioning arm between said proximal and distal ends thereof and operable to bear against said rear wall of said rear section of said wall housing.

4. The mounting apparatus as in claim 2, wherein said proximal end of said positioning arm is pivotally coupled to said rear wall of said rear section of said wall housing.

5. The mounting apparatus as in claim 1, wherein said mounting plate includes a back portion coupled to said distal end of said positioning arm with an upstanding fastener that defines a vertical axis about which said mounting plate is selectively swiveled between a left viewing configuration and a right viewing configuration.

6. The mounting apparatus as in claim 5, wherein said upstanding fastener is one of a bolt or a rod.

7. The mounting apparatus as in claim 1, wherein:
said back portion of said mounting plate has a planar configuration that is upstanding and defines a vertical orientation at all times; and
said front portion of said mounting plate is parallel with said mounting plate at said upstanding configuration and is offset from said back portion at said tilted configuration.

8. A mounting apparatus for positioning a television relative to a wall and a fireplace mantle, so that the television is positioned flush against an exterior surface of the wall, said mounting apparatus comprising:
a wall housing includes a rear section inset into the wall and having a rear wall and a front section forward of said rear section and defining an open front and an interior area, said open front being flush with a front surface of the wall;
a positioning arm having a proximal end pivotally coupled to said wall housing and a distal end opposite said proximal end and a body portion having a linear configuration extending between said proximal and distal ends,
said positioning arm being pivotally movable between a retracted configuration positioned completely inside said interior area and a deployed configuration extending at least partially outside of and extending away from said interior area;
a mounting plate coupled to said distal end of said positioning arm with an upstanding fastener that defines a vertical axis about which said mounting plate is selectively swiveled between a left viewing configuration and a right viewing configuration; and
said mounting plate is operably coupled to said distal end of said positioning arm and positioned inside said interior area at said retracted configuration and positioned outside said interior area at said deployed configuration,
said mounting plate including a back portion coupled to said distal end of said positioning arm and that includes a front portion pivotally coupled to said back portion with a hinge defining a horizontal axis about which the mounting plate is selectively pivoted between a normally upstanding configuration and a tilted configuration in which a bottom edge of said mounting plate is displaced outwardly and forwardly of said back portion said mounting plate.

9. The mounting apparatus as in claim 8, further comprising a travel stop mounted to a top surface of said positioning arm between said proximal and distal ends thereof and operable to bear against said rear wall of said rear section of said wall housing.

10. The mounting apparatus as in claim 8, wherein said proximal end of said positioning arm is pivotally coupled to said rear wall of said rear section of said wall housing.

11. The mounting apparatus as in claim 8, wherein:
said back portion of said mounting plate has a planar configuration that is upstanding and defines a vertical orientation at all times; and
said front portion of said mounting plate is parallel with said mounting plate at said upstanding configuration and is offset from said back portion at said tilted configuration.

12. A mounting apparatus for positioning a television relative to a wall and a fireplace mantle, so that the television is positioned flush against an exterior surface of the wall, said mounting apparatus comprising:
a wall housing inset into the wall and defining an open front and an interior area, said open front being flush with a front surface of the wall;
a positioning arm having a proximal end pivotally coupled to said wall housing and a distal end opposite said proximal end and a body portion having a linear configuration extending between said proximal and distal ends,
said positioning arm being pivotally movable between a retracted configuration positioned completely inside said interior area and a deployed configuration extending at least partially outside of and extending away from said interior area; and
a mounting plate operably coupled to said distal end of said positioning arm and positioned inside said interior area at said retracted configuration and positioned outside said interior area at said deployed configuration.

13. The mounting apparatus as in claim 12, wherein said mounting plate includes a back portion coupled to said distal end of said positioning arm and that includes a front portion pivotally coupled to said back portion with a hinge defining a horizontal axis about which the mounting plate is selectively pivoted between a normally upstanding configuration and a tilted configuration in which a bottom edge of said mounting plate is displaced outwardly and forwardly of said back portion said mounting plate.

14. The mounting apparatus as in claim 12, wherein said mounting plate includes a back portion coupled to said distal end of said positioning arm with an upstanding fastener that defines a vertical axis about which said mounting plate is selectively swiveled between a left viewing configuration and a right viewing configuration.

15. The mounting apparatus as in claim 14, wherein said upstanding fastener is one of a bolt or a rod.

16. The mounting apparatus as in claim 12, wherein said wall housing includes a rear section having a rear wall and a front section forward of said rear section, said front section defining said open front and said interior area.

17. The mounting apparatus as in claim 16, further comprising a travel stop mounted to a top surface of said positioning arm between said proximal and distal ends thereof and operable to bear against said rear wall of said rear section of said wall housing.

18. The mounting apparatus as in claim 16, wherein said proximal end of said positioning arm is pivotally coupled to said rear wall of said rear section of said wall housing.

* * * * *